(12) United States Patent
Chen et al.

(10) Patent No.: US 11,909,817 B2
(45) Date of Patent: Feb. 20, 2024

(54) SCALABLE AND SECURE VEHICLE TO EVERYTHING COMMUNICATIONS

(71) Applicant: Verizon Patent and Licensing Inc., Basking Ridge, NJ (US)

(72) Inventors: Ming Chen, Bedford, MA (US); Pramod Kalyanasundaram, Acton, MA (US); Jianxiu Hao, Acton, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 814 days.

(21) Appl. No.: 16/992,403

(22) Filed: Aug. 13, 2020

(65) Prior Publication Data

US 2020/0374342 A1     Nov. 26, 2020

Related U.S. Application Data

(63) Continuation of application No. 15/639,257, filed on Jun. 30, 2017, now Pat. No. 10,778,758.

(51) Int. Cl.
| | |
|---|---|
| *H04L 67/10* | (2022.01) |
| *H04L 67/104* | (2022.01) |
| *H04L 67/12* | (2022.01) |
| *H04W 4/40* | (2018.01) |
| *H04W 4/46* | (2018.01) |
| *H04W 4/44* | (2018.01) |
| *G07C 5/00* | (2006.01) |
| *H04W 4/02* | (2018.01) |

(52) U.S. Cl.
CPC .......... *H04L 67/1044* (2013.01); *H04L 67/12* (2013.01); *H04W 4/40* (2018.02); *H04W 4/44* (2018.02); *H04W 4/46* (2018.02); *G07C 5/008* (2013.01); *H04W 4/02* (2013.01)

(58) Field of Classification Search
CPC .................................................. B60R 21/213
USPC ................................ 296/24.42, 24.46, 24.31
See application file for complete search history.

(56) References Cited

U.S. PATENT DOCUMENTS

| | | | |
|---|---|---|---|
| 8,786,605 B1 * | 7/2014 | Curtis .................. | G06Q 10/047 |
| | | | 701/422 |
| 10,309,788 B2 * | 6/2019 | Davidson ........... | G01C 21/3852 |
| 2008/0192054 A1 | 8/2008 | Fowler et al. | |
| 2017/0274827 A1 * | 9/2017 | Lewis .................... | H04N 23/63 |
| 2017/0352200 A1 | 12/2017 | Wang et al. | |
| 2017/0369055 A1 | 12/2017 | Saigusa et al. | |
| 2018/0196427 A1 * | 7/2018 | Majumdar ............ | B60W 40/09 |

* cited by examiner

*Primary Examiner* — Kiet M Doan

(57) ABSTRACT

A method for scalable and secure vehicle to everything communications may include receiving telematics data from a plurality of vehicles and tracking the vehicles within a window which is centered based on the telematics data. The position of the window may be determined based on positions of the vehicles. The method may include dividing the vehicles within the window into partitions having sizes based on a maximum number of vehicles within the partitions, and determining a metric representing a suitability of communications between the vehicles in the window.

20 Claims, 7 Drawing Sheets

SCALABLE AND SECURE VEHICLE TO EVERYTHING COMMUNICATIONS

CROSS REFERENCE TO RELATED APPLICATIONS

This application is a continuation of application Ser. No. 15/639,257, entitled "SCALABLE AND SECURE VEHICLE TO EVERYTHING COMMUNICATIONS," filed Jun. 30, 2017, the contents of which are hereby incorporated herein by reference in their entirety.

BACKGROUND

Next generation wireless communications promise reduced latency and increased bandwidth, and thus may permit road vehicles to communicate with each other and/or with various road infrastructure elements. Accordingly, vehicle-to-everything (V2X) communications allow vehicles to exchange information with other vehicles (e.g., vehicle-to-vehicle (V2V) communications), with an infrastructure (e.g., vehicle-to-infrastructure (V2I) communications), with pedestrians (e.g., vehicle-to-pedestrian (V2P) communications), etc. V2X communications may enhance safety and improve vehicle energy efficiency.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Vehicle-to-everything (V2X) communication may present scalability and security challenges in delivering secure and efficient communication services between vehicles (V2V) and infrastructure elements (V2I). Embodiments herein address these scalability and security issues to deliver real time network services for large numbers of moving vehicles. Embodiments herein may cluster vehicles into areas defined by binary space partitioning to better distribute the number of vehicles for communication and computational efficiency. Once clustered and distributed into binary space partitions, embodiments may perform efficient searches within binary space partitions to determine which vehicles should communicate with each other. The search may be based on a metric representing the suitability for communications between vehicles/infrastructure elements (defined herein as the "suitability metric"), and may include a number of different parameters, including telematics data from vehicles in the communications service area. Additionally, embodiments may utilize a quad tree data structures to efficiently represent the binary space partitions, and a peer-to-peer validation engine based on, for example, a private block chain.

Figure 1:
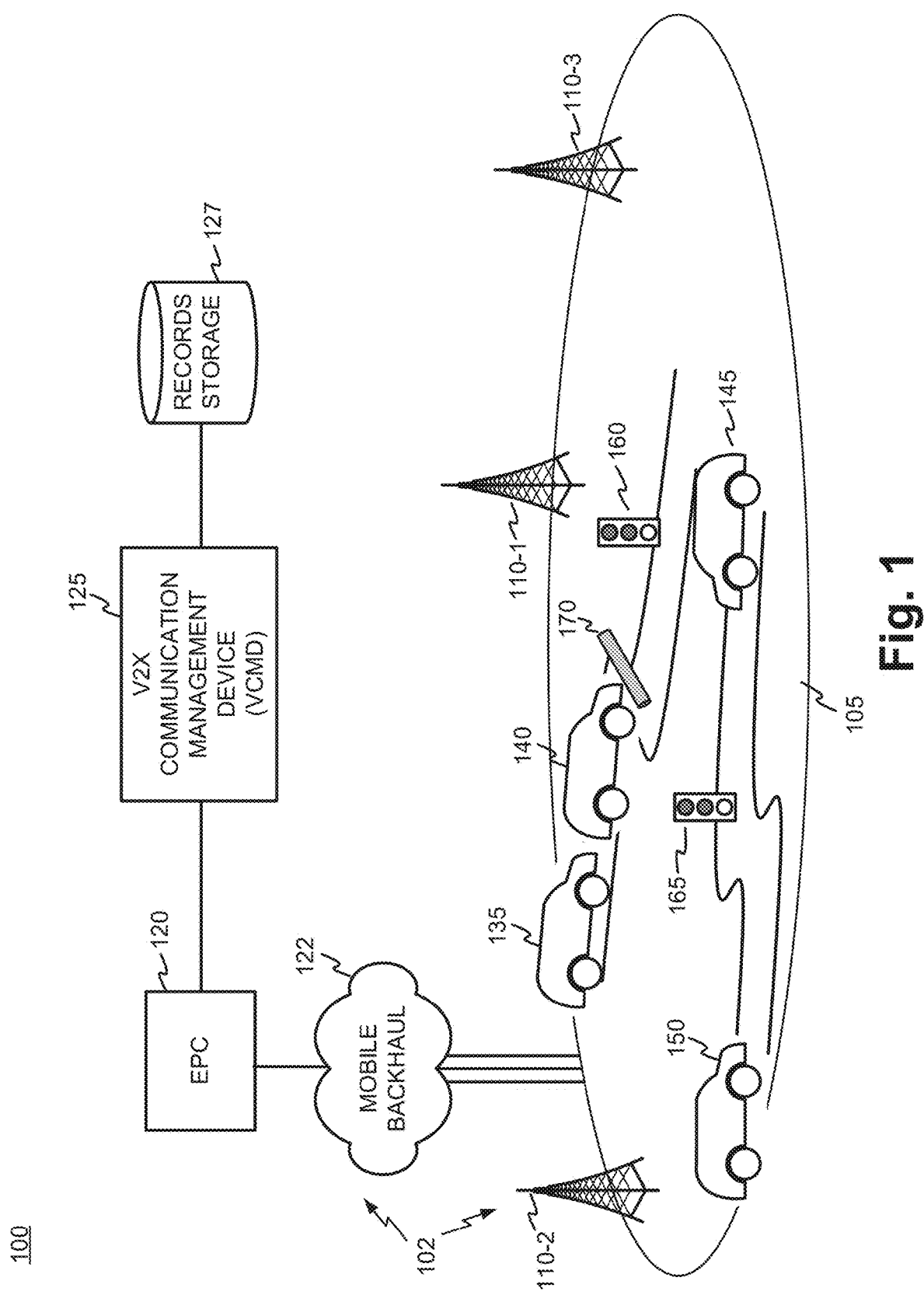
FIG. 1 is a diagram showing an exemplary environment utilizing vehicle-to-everything (V2X) communication.

FIG. 1 a diagram showing an exemplary environment 100 utilizing vehicle to everything (V2X) communication. Environment 100 may include a service area 105, a wireless mobile communications system 102, which may include eNodeBs 110 (herein referred to plurally as "eNodeBs 110," generically as "eNodeB 110," and individually as "eNodeB 110-*x*"), an Extended Packet Core (EPC 120), and a mobile backhaul 122. Environment 100 may further include a V2X communication management device (VCMD) 125, records storage 127, vehicles 135-150, and infrastructure elements 160, 165 (e.g., stop lights). Other embodiments may use additional or fewer components shown in FIG. 1, depending upon, for example the standards and/or protocols used by wireless mobile communications system 102, and/or other implementations for VCMD 125.

In service area 105, communications between vehicles 135-150 may improve safety by providing accurate estimations of position, velocity (e.g., speed and direction), awareness of presence of nearby vehicles obscured by blind spots, and/or information of inputs such as steering input, brake pressure, etc. Various data types (voice, text, video, encoded binary, etc.) and protocols of communications between vehicles 135-150 within service area 105 may be facilitated via a group of eNodeBs 110 controlled by EPC 120 through mobile backhaul 122. Communications between vehicles and/or infrastructure elements may use V2X communications management device 125 (VCMD), in addition to EPC 120 and mobile backhaul 122, to permit the scalable and secure exchange of V2X data between vehicles 135-150 and/or infrastructure elements (e.g., stop lights 160, 165). Because of the potentially large number of vehicles 135-150 and/or infrastructure devices 160, 165 in service area 105, VCMD 125 may determine the suitability metric, and thus reduce V2X exchanges so the system does not become overwhelmed with unnecessary inter-vehicle communication.

In order to manage V2X communications, VCMD 125 may receive dynamic information from vehicles 135-150 in service area 105, which may be equipped with the appropriate User Equipment (UE) devices as described below. In an embodiment, a UE device equipped with a Global Positioning System (GPS) receiver may generate and transmit position, velocity, and associated time stamp information of each vehicle. Additionally or alternatively, vehicles may also include adapters which plug into a vehicle's On-Board Diagnostic (OBD) system (such as, for example, Verizon's Hum system) that may also provide position, velocity, and associated time stamp information of each vehicle, in addition to on-board sensor data from vehicles 135-150. Additional information that may be sent by the UE and/or the OBD system can include classification of vehicles (e.g., emergency vehicles, government vehicles, private/public transportation vehicles, etc.), and/or classification of transmission (normal communication, emergency communication, government communication, etc.). Thus, the dynamic information from each vehicle 130-150 may be uploaded to VCMD 125 by UEs via the wireless mobile communication system 102.

Once VCMD 125 receives telematics data from the vehicles in service area 105, it may divide service area 105 into partitions which include a limited number of vehicles to bound the computational workload and/or communications exchanges to a specific group of vehicles over a predetermined period of time. VCMD 125 may then compute the suitability metric for each vehicle 130-160 in service area 105. This computed suitability metric determines the "desirability" of vehicles within the partition to engage in V2X communications, based at least in part on the telematics data and/or other information received from vehicles 135-150. The VCMD 125 thus determines which vehicles 135-150 (and/or infrastructure elements 160, 165) may communicate each other using V2X communications. Once determined, the VCMD 125 may centrally control the V2X communications between each vehicle 135-150 and/or infrastructure element 160, 165 for efficient and secure operation. Alternatively, distributed control among UEs may be performed by having VCMD 125 download management commands providing dynamic access lists directing each UE to communicate to specific vehicles based on the suitability metric for communications. Distributed control may support peer-to-peer communications between vehicles 135-150 and/or infrastructure elements 160, 165.

For example, further referring to FIG. 1, after vehicles 135-150 send telematics data to VCMD 125 via wireless mobile communications system 102, VCMD 125 may initially partition service area 105 (as described in more detail below with respect to FIGS. 2, 3A, and 3B) for efficient operation, and then determine suitability metrics for each vehicle 135-150. Based on the suitability metrics, VCMD 125 will determine which vehicles 135-150 and/or infrastructure elements should communicate with each other. Given the close proximity of vehicles 135 and 140, VCMD 125 may allow vehicles 135 and 140 to exchange information with each other. In example shown in FIG. 1, sensors from vehicle 140 may determine the presence of obstacle 170 in the road, which will be obscured to vehicle 135. Obstacle 170 may cause vehicle 140 to brake suddenly, and in order to avoid an accident, V2X communications sent by vehicle 140 to vehicle 135 may provide an alert regarding obstacle 170 to vehicle 135 in order to provide more time to brake. The message sent to vehicle 135 from vehicle 140 may include an event description of hazard 170 (via text data and/or a numerical code) and/or state information of vehicle 140. The state information may include, for example, the position, velocity, acceleration, information based on sensors within vehicle 140, etc. The message may further include other information (e.g., an image or a video of hazard 170) obtained through sensors associated with the UE in vehicle 140. In an embodiment, VCMD 125 may analyze the message sent by vehicle 140 in terms of the type of hazard, the velocity of vehicle 140 and other vehicles in the vicinity, and may determine that other vehicles in addition to vehicle 135 should receive V2X communications sent from vehicle 140.

Because time may be a critical factor in avoiding accidents, providing vehicle 135 an earlier warning, even on the order of fractions of a second, may avoid a collision with vehicle 140. In addition, given the proximity of stop light 160 to vehicles 135 and 140, VCMD 125 may permit communications between stop light 160 and vehicles 135 and 140 to, for example, provide timing data of stoplight 160. Because, for example, vehicles 145 and 150 are on a different road and are relatively distant from vehicles 135, 140, VCMD 125 would not typically permit V2X communications between vehicles 135, 140 and vehicles 145, 150.

Further referring to FIG. 1, VCMD 125 may not permit vehicle communications between vehicle 145 and vehicle 150 because they are sufficiently distant and will not physically interact at the point in time shown in FIG. 1. However, VCMD 125 may permit vehicle 145 and vehicle 150 to communicate with stop light 165 receive stop light timing data. As time goes on, VCMD 125 may track vehicles 145 and 150 as they approach each other. At a particular time, VCMD 125 may allow data exchanges between vehicle 145 and vehicle 150 as the distance between them decreases. The particular time at which VCMD 125 permits inter-vehicle communications (e.g., V2V communications) between vehicle 145 and vehicle 150 may be determined by VCMD 125 and be based on the velocity of the vehicles.

In order to accurately track vehicles proximate to each other, telematics data should be updated at least every few seconds. Since both OBD interfaces and UEs may be able to connect to wireless mobile communications system 102 using 4G, 5G and/or other modern standards, data may be exchanged without significant latency, and thus vehicles 135-150 share information to improve safety and awareness without having to rely on traditional vehicle sensors (e.g., radar, lidar, etc.) or even without a clear line of sight between vehicles.

In another embodiment, the data analysis and processing of telematics data may be performed locally within a vehicle (using the UE and/or the OBD interface), in addition, or as an alternative to, VCMD 125 which resides "in the cloud". As the number of vehicles 135-150 in a fixed range of area have an upper bound, the desired computational power to achieve a reasonable latency may be estimated.

In addition to preventing car accidents, V2X communications can also record all events on the road. With these records, embodiments may assist authorities to provide detailed facts about traffic accidents, and help victims in gathering evidence to protect their rights. In additional, systems improvements may be based on the data collected using so called "big data" techniques. Security may also be provided based on block chain techniques as described below in reference to FIG. 5.

Further referring to FIG. 1, eNodeBs 110 may exchange traffic data with EPC 120 via mobile backhaul network 122. Mobile backhaul network 122 may further exchange traffic between eNodeBs in an LTE system without having to go through the EPC 120. EPC 120 may further exchange traffic data with VCMD 125 over a Wide Area Network (WAN) (not shown). Additionally, eNodeBs 110 may be functionally interconnected to each other in addition to being separately connected to mobile backhaul network 122, and may be referred to as the evolved UMTS Terrestrial Radio Access Network (eUTRAN). In other embodiments using different wireless standards, the eNodeBs 110 may be referred to as base stations and the eUTRAN referred to simply as a Radio Access Network (RAN). In addition to exchanging traffic with eNodeB 110 via mobile backhaul network 122, EPC 120 may perform control operations for eNodeBs 110 and UEs within vehicles 135-150 based at least in part on control plane signals (e.g., Non-Access Stratum functionality). EPC 120 may interface with other EPCs through a WAN (not shown) to exchange traffic data.

Further referring to FIG. 1, mobile backhaul network 122 may be any type network which supports one or more eNodeBs 110 for interfacing with EPC 120. Mobile backhaul network 122 may include Cell Site Routers (CSRs), Extended Backhaul (EBH) network(s), optical networks which include wavelength division multiplexed (WDM)

optical components, multiservice provisioning platforms (MSPPs), metro-Ethernet networks, etc.

EPC 120 may be a core networking infrastructure that provides mobility management, session management, V2X functionality, authentication, and packet transport to support UEs and eNodeBs 110 for wireless communication. EPC 120 may be compatible with known wireless standards which may include, for example, LTE (4G), LTE Advanced, LTE Advanced Pro, 5G, etc.

ENodeB 110 may be any type of base station that can be included within any type of radio access network, and can be compatible with known wireless standards. Such standards may include, for example, LTE (4G), LTE Advanced, LTE Advanced Pro, 5G, etc. In some embodiments, eNodeB 110 may be a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s), a vehicular network (e.g., 801.11p), and/or or a WiMAX IEEE 802.16. While the embodiment shown in FIG. 1 may use one or more wireless standards (e.g., 4G, 5G, and/or IEEE 801.11p) to provide V2X communication, any suitable wireless standards and/or non-standard systems may be used in other embodiments.

VCMD 125 may be any type of networking device which may receive telematics data from vehicles 135-150, partition service area 105 based on vehicle density, determine metrics for the suitability of communications for vehicles 135-150, and control how V2X messages will be exchanged between vehicles 135-150. In an embodiment, the control of V2X exchanges in service area 105 may be centrally performed by VCMD 125. That is, all V2X messages may go through VCMD 125. In another embodiment, V2X messaging may be set up by VCMD 125 which decides how V2X messages will be exchanged among vehicles 135-150 in service area 105, and then provides appropriate management commands to UEs and/or infrastructure elements 160, 165 delineating how V2X data will be exchanged. The management commands may be a list sent to a UE associated with a particular vehicle, where the management commands indicate other vehicles/infrastructure elements for which that particular vehicle may exchange data. Upon receiving the management commands, the UE may locally control the V2X communications, which may permit a communications flow more closely resembling a peer-to-peer communications model, since all of the V2X messages need not flow through the VCMD 125. VCMD 125 may further provide authentication and security functionality using private block changes, as described below in relation to FIG. 5. Accordingly, VCMD 125 may be implemented as a general processor-based system executing software (e.g., a server or other network element), or embodied using dedicated hardware (e.g., application specific integrated circuits (ASICs), field programmable gate arrays (FPGAs), etc.), or as a combination thereof. VCMD 125 may interface to EPC 120 thorough a WAN (such as the Internet), or may alternatively connect to EPC 120 through a local area network or a dedicated interface. Details of an embodiment of VCMD 125 are discussed below in reference to FIGS. 6 and 7.

Records storage 127, which may be directly connected or coupled through a network to VCMD 125, may store any type of data used in operation with VCMD 125. Records storage 127 may store telematics data uploaded from the vehicles 135-150, intermediate processing data, suitability metrics over time for vehicles 135-150, and/or historical data associated with V2X communications. For example, VCMD 125 may record all events occurring in service area 105 in records storage 127. With these records, embodiments may assist authorities to provide detailed facts about traffic accidents, and/or help victims in gathering evidence to protect their rights. In addition, systems improvements may be based on the data collected using so called "big data" techniques. Records storage 127 may also store data associated with securing V2X communications, such as, for example, private block chain data as discussed below in relation to FIG. 5.

While not shown in FIG. 1, UEs located within vehicles 135-150 may exchange data with wireless mobile communications system 102 by uploading telematics data to VCMD 125. Once VMCD 125 processes the telematics data and computes the suitability metric for each vehicle 135-150 in service area 105, VCMD 125 may centrally control the V2X communications between each vehicle 135-150 and/or infrastructure element 160, 165 for efficient and secure operation. Alternatively, as noted above, distributed control among UEs may be performed by having VCMD 125 download management commands providing dynamic access lists directing each UE to communicate to specific vehicles based on the suitability metric. Moreover, UEs may work in conjunction with OBD interfaces (e.g., Verizon's Hum) to obtain vehicle information. In an embodiment, the UE and OBD may be separate devices that communicate over local channel, which may include a wired and/or wireless protocol (e.g., Bluetooth, Bluetooth LE, or WiFi). Alternatively, the UE and OBD interface may be combined into a single device which may obtain vehicular information and communicate directly with the wireless mobile communications system 102. In another embodiment, the UE may include its own position determination system (e.g., global positioning system (GPS), accelerometers, etc.), and provide position, velocity, and/or time stamp data as a substitute for an OBD interface, or in conjunction with an OBD interface, where position, velocity, and time stamp information may be combined.

In an embodiment, the UE may be realized as device built into a vehicle's dashboard and serve as a navigation system and user interface that may wirelessly connect to wireless mobile communications system 102. The on-board transceiver associated with the UE may be integral to the chassis associated with the display, or may be included in a separate chassis which is functionally connected to the chassis. The user may enter inputs using a touch screen associated with the UE, other user physical input devices (e.g., a joystick, a touch pad, dial(s), buttons, etc.), and/or voice recognition. The UE may have the ability to download additional software in the form of applications (i.e., "apps"), which may be provided via the wireless communications system 102, or downloaded using a local connection. The apps may include so called "over the top" applications that provide various services supporting V2X communications.

In another embodiment, the UE may be a separate mobile device which can be placed within the vehicle, or be removably attached to an interior surface of the vehicle. For example, the UE may be a smart phone removably coupled to a cradle that can be mounted to the interior of the front windshield of the vehicle or to dash pad. The cradle may only serve a mechanical function to secure the UE, or may additionally provide electrical functionality to interface with one or more vehicle electronic systems within the vehicle (e.g., OBD), and/or accept vehicle power for charging the UE. UE may support a variety of wireless interfaces with the vehicle which may include, for example, Bluetooth, Bluetooth Low Energy, Zigbee, Wi-Fi, etc. Additional wireless interfaces may be used, for example, to facilitate the interface of the UE with the vehicle.

The UE may include any type of mobile electronic device having communication capabilities, and thus communicate over a network using one or more different channels, including both wired and wireless connections. The UE may include, for example, a cellular (e.g., LTE (4G), LTE Advanced, LTE Advanced Pro, 5G, etc.) mobile phone, a smart phone, a tablet, any type of IP communications device, a laptop computer, or a palmtop computer. In various embodiments, wireless channels over which the UE communicates may be supported by any cellular radio access network (RAN), such as, for example, an LTE eUTRAN. In other embodiments, the wireless channels may be supported by a local or wide area wireless network. A local area wireless network may include any type of Wi-Fi (e.g., any IEEE 801.11x network, where x=a, b, c, g, and/or n). A wide area wireless network may include any type wireless network covering larger areas, and may include a mesh network (e.g., IEEE 801.11s), vehicular networks (e.g., 801.11p), and/or or a WiMAX IEEE 802.16.

Figure 2:
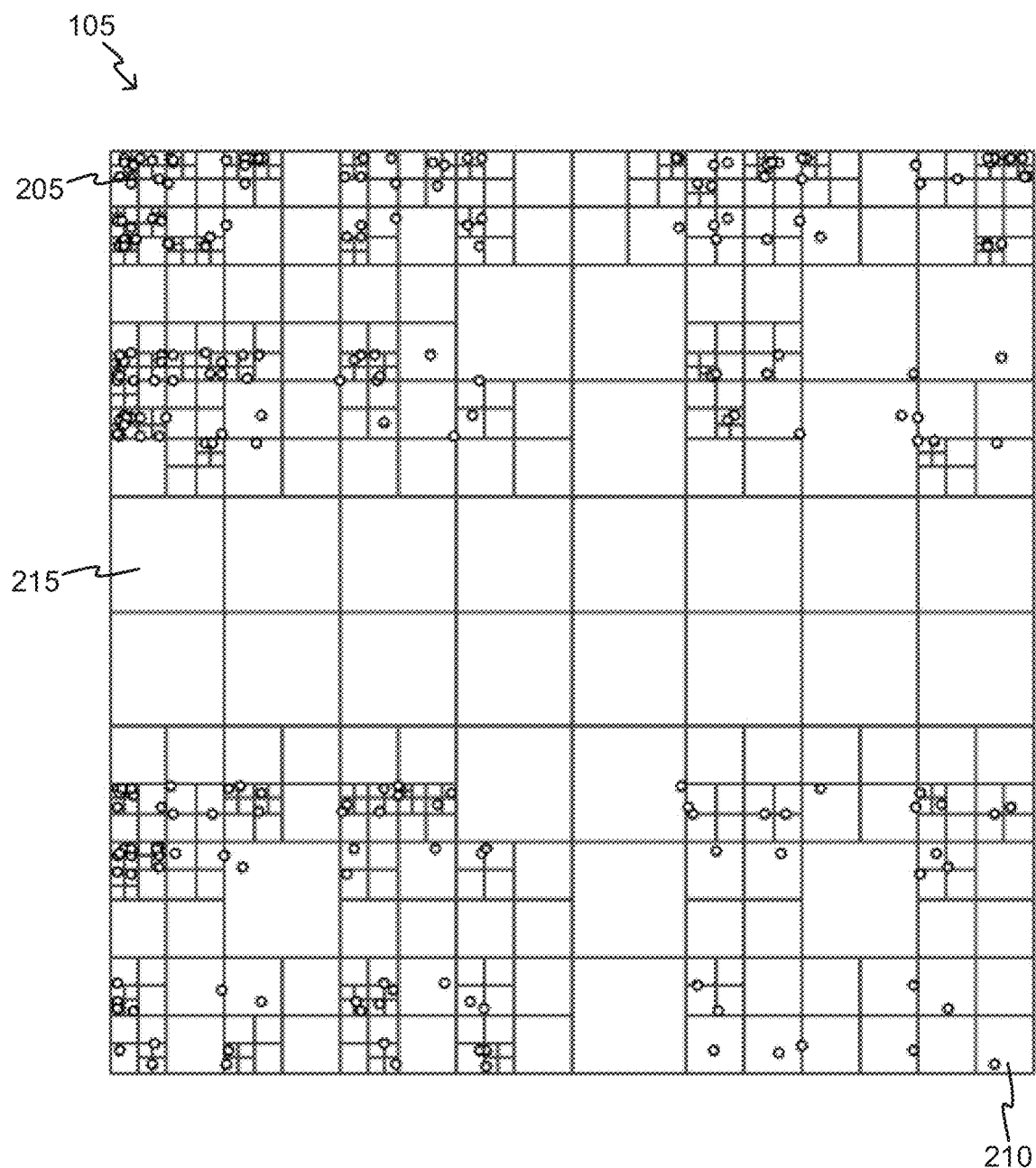
FIG. 2 is a diagram illustrating binary space partition (BSP) of a service area for facilitating V2X communication.

FIG. 2 is a diagram illustrating service area 105 divided into binary space partitions (BSP) for facilitating V2X communications. Given the potentially large number of vehicles within service area 105, a parallel architecture can be used to efficiently manage V2X communications. Because one purpose of V2X communication is to improve safety through collision avoidance, a given vehicle may restrict V2X communications to proximate vehicles within a particular vicinity. The vicinity may vary, and change over time, and could depend on the speed of the vehicles, the type of vehicles (e.g., cars, buses, trucks), and/or the purpose of the vehicles for being on the road (e.g., private transportation, public transportation, emergency response, etc.). Accordingly, VCMD 125 may manage how vehicles exchange messages based on information provided by positioning systems (e.g., GPS) from the vehicles, and meta-data describing information about vehicles themselves as noted above. To most effectively employ a parallel process to manage V2X communication, a "divide and conquer" approach may be used which subdivides service area 105 into parcels having a relatively uniform density of vehicles. By equalizing the vehicle density over partitions making up service area 105, VCMD 125 may prevent unbalanced computational workloads and more effectively use processing and communication channel resources.

In an embodiment, service area 105 may be divided using binary space partitioning to separate data processing tasks into smaller structured pieces amenable to parallel processing based on, for example, position, velocity, and other attributes. Binary space partitioning is a method for recursively subdividing a space. In two dimensions, BSPs may be initially established by halving an undivided area in the vertical and horizontal dimensions. Additional partitioning may be performed by further subdividing the BSPs previously generated in the vertical and horizontal dimensions. The subdividing may be continued in a recursive manner until each partition has an approximate uniformity of density. In an embodiment, the recursion may be controlled based on a predetermined maximum number of vehicles within any one BSP. Once the predetermined maximum is exceeded, a BSP may subdivide again and cover a smaller area in order to include a fewer number of vehicles.

For example, as shown in FIG. 2, the small circles in service area 105 represent individual vehicles at a given point in time. In the area associated with BSP 205, there is a high density of vehicles, so BSP 205 is the result of multiple iterations of subdivision. Each BSP in FIG. 2 has no more than two vehicles, and in this example represents a small physical area encompassing two vehicles. In the area associated with BSP 210, the density is low as only one vehicle is present in a larger area than BSP 205, so BSP 210 underwent fewer iterations of subdividing than BSP 205. In the area associated with BSP 215, no vehicles exist, thus no further subdividing occurred within BSP 215. The spatial subdivision based on BSPs may permit vehicles within service area 105 to be represented using a data structure called a quad tree, and thus allow efficient processing for managing V2X communications. The relationship between quad tree data structures and BSPs is explained further below in reference to FIGS. 3A and 3B.

Figure 3A:
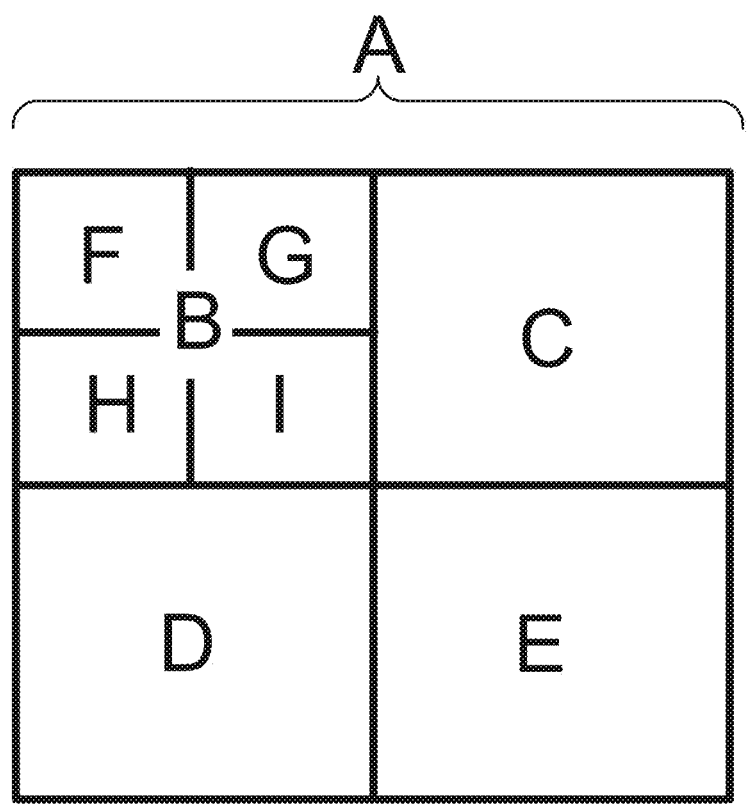
FIGS. 3A and 3B are diagrams illustrating the relationship between binary space partitions and representations of objects therein using quad tree data structures.
Figure 3B:
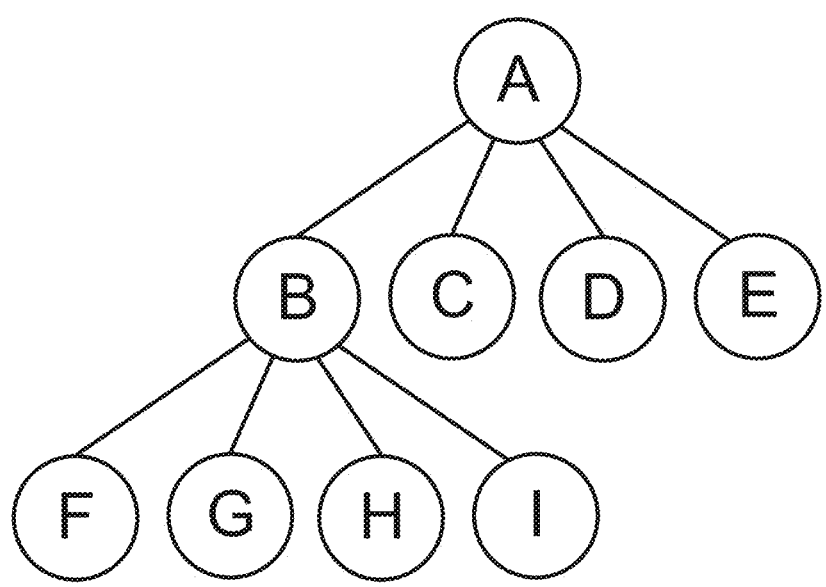

FIGS. 3A and 3B illustrate the relationship between binary space partitions and representations of objects included therein using quad tree data structures. FIG. 3A shows a binary space partitioning of an area A. Area A has been divided into four sub-quadrants: B, C, D and E. Sub-quadrant B has been further divided into four sub-quadrants F, G, H, and I. The partitioning of area A in space in two dimensions as shown in FIG. 3A may be represented by the quad tree 300 shown in FIG. 3B. The nodes in quad tree 300 are shown as circles, and provide a hierarchical representation having a structure associated with the sub-quadrants of area A. Each node may correspond a particular sub-quadrants (with the exception of node A, which represents area). Accordingly, node A has four child nodes representing sub-quadrants B-E. Because sub-quadrant B is further divided into four sub-quadrants F-I, node B has four corresponding child nodes F-I. Nodes C-E and F-I, which are not associated with any child nodes, are referred to as "leaf nodes" or simply "leaves." A useful property of binary space partitioning and the quad tree data structure is that each leaf node may be broken into four child nodes upon the associated sub-quadrant reaching the predefined maximum number of vehicles (i.e., when the sub-quadrant "reaches capacity"). Therefore, the workload associated with VCMD 125 may be further split into smaller parts having similar workloads to improve efficiency through parallel processing.

Accordingly, VCMD 125 may use quad tree data structure 300 to store information regarding vehicles (e.g., telematics data, suitability metrics, blockchain data, etc.) and process the data in a hierarchical manner which is associated with the physical sub-quadrants of area A.

To initialize the binary space partitioning appropriately, information regarding traffic load obtained from UEs in each of vehicles is received by VCMD 125 that shows the detailed density of vehicle at different locations. Thus, more computation resources can be assigned to crowded roads where heavier workloads are to be processed. Upon receiving the telematics data, VCMD 125 may map geographic coordinates to positions in the road system and may update the binary space partitions and the corresponding nodes in quad tree data structure 300 based on vehicle position. Since collisions can happen at the edges of a sub-region, only analyzing data on one leaf is not enough. Thus, updates to sub-quadrants to which the vehicle belongs will be made as well as adjacent sub-quadrants. In an embodiment, after a fixed time interval, VCMD 125 may send analyzed data from each sub-quadrant to the UEs in the vehicles, and may include for example, depending upon the embodiment, management commands providing dynamic access lists to UEs, collision warnings, road hazard warnings, etc. Accordingly, by using quad tree 300, VCMD 125 may efficiently perform searches among proximate vehicles and determine suitability metrics in order to manage V2X communications in service area 105.

Figure 4A:
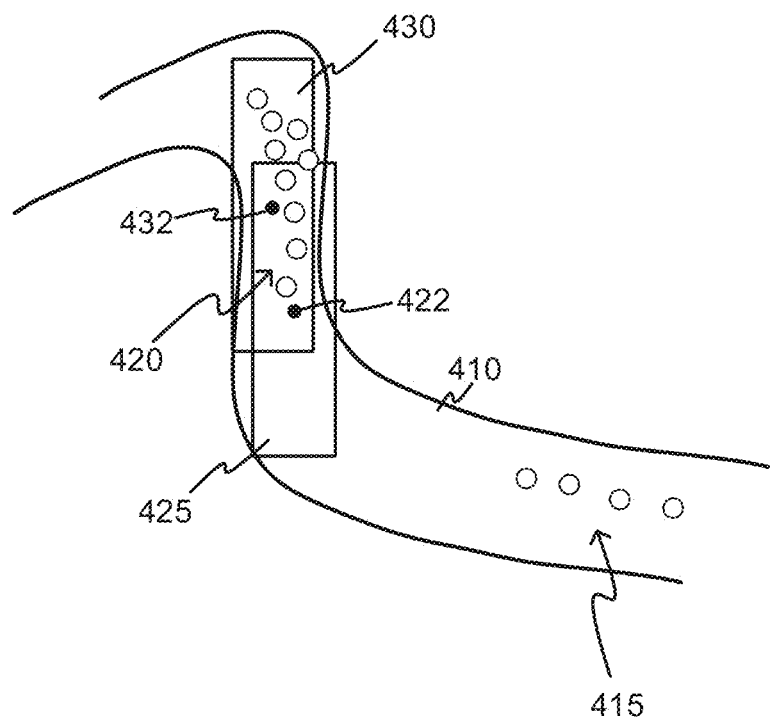
FIGS. 4A and 4B are diagrams showing clustering approaches which may be used to facilitate the generation of binary space partitions of a service area.
Figure 4B:
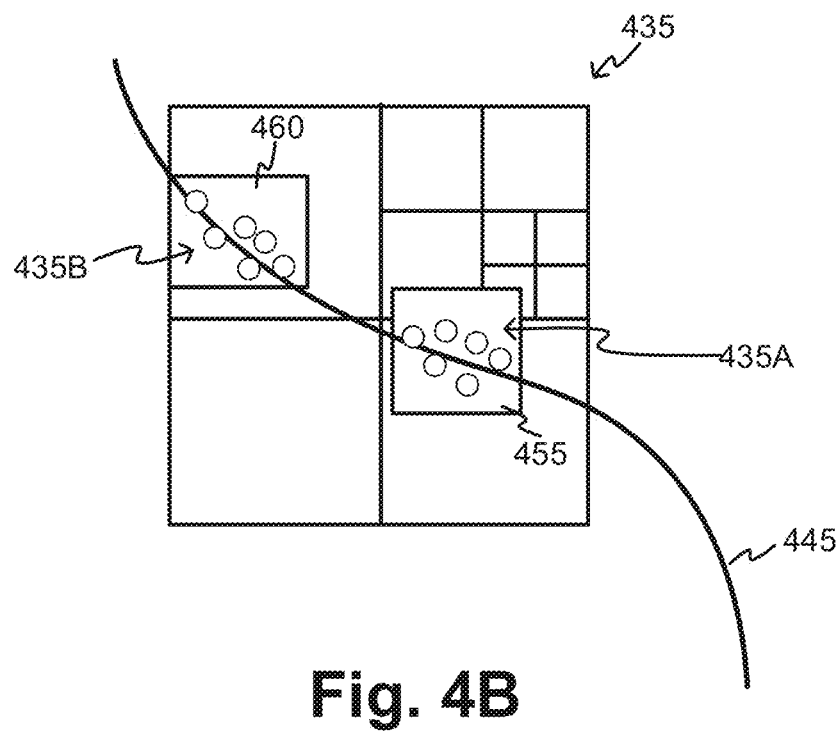

FIGS. 4A and 4B show clustering approaches which may be used to facilitate the generation of BSPs of service area 105. The generation of the BSPs may be based at least in part on how vehicles are grouped together within service area 105. To properly subdivide service area 105 into BSPs for distributing the density of vehicles for efficient parallel processing, clustering operations may be performed to identify how vehicles are spatially grouped together. In order to improve computational efficiency, clustering operations may be separated into distinct categories: initial clustering and parallel shift clustering.

FIG. 4A illustrates a diagram representing a roadway 410 where initial clustering may be performed at an initial point in time to establish the first binary space partition. The initial clustering operation may begin by selecting a starting point 422 within service area 105 which has not been previously clustered. A starting window 425 may be centered at starting point 422. The shape and/or size of starting window 425 may be based on the capabilities and/or quality of the channels used for supporting V2X communications. For example, the size of window 425 may be based on the channel's bandwidth, signal-to-noise, signal-to-interference and noise, error rates, modulation coding scheme (MCS) values, etc. The shape of the window may be based on the road types, terrain, the channel quality, and/or the channel capabilities. In the embodiment shown in FIG. 4A, window 425 may be a rectangle having a length based on bandwidth, and a width based on a fraction of the length (wherein the fraction could be based on road width). In another embodiment, window 425 may be a circle having a radius proportional to the bandwidth of the channel. Window 425 may include, in whole or in part, a group of vehicles 420. Note another group of vehicles 415 is outside window 425, and thus not included in the initial clustering operation.

For the group of vehicles 420 included within starting window 425, a weighted mean may be computed based on the one or more parameters associated with the vehicles. For example, the weighted mean may be based on the distance from starting point 422 to each vehicle in window 425. In this embodiment, because the weight is a distance to each vehicle, the weight may be considered a "lever arm" to each vehicle. Thus, the weighted mean may be interpreted as a centroid of the group of vehicles 420. The weighted mean may be computed in two dimensions, thus resulting in a translated center point 432, which is used shift the window to new position, resulting in shifted window 430. In other embodiments, the weighted mean may take into account other parameters, such as vehicle velocities (or simply directions of travel), attributes of the vehicle (commercial, private, government, emergency, etc.), or any other information that may be included in telematics data received from the vehicles in window 425.

The weighted mean may be recomputed in a recursive fashion until the value converges (i.e., does not change by an appreciable amount) and the most recent window includes vehicles in vehicle group 420 merged into an initial cluster. Once the vehicles in the service area are initially clustered, VCMD 125 may generate an initial BSP. The computational complexity of the initial clustering operation is $O(n^2)$, where n is the number of vehicles being processed. Thus, determining the initial clusters may be a relatively computationally intensive process, and may only be done at the initial set up phase. Afterwards, as time passes, the initial clusters may be updated in an ongoing manner by computing parallel shifting clusters, and modifications to the initial BSP may be made based on the parallel shifting clusters.

FIG. 4B illustrates a diagram representing roadway 410 where parallel shift clustering may be performed to modify the binary space partition as time progresses. Parallel shift clustering may be performed because, as time goes on, the position of the cluster will move; however, most of the vehicles within the cluster will stay within the original cluster. During this process, the movement of the cluster, as well as the addition and/or dropping off of individual vehicles from the cluster, may be tracked and used to update the BSP as time passes. The shifting operations are much less computationally intensive than the initial clustering operation, and may be quickly performed by VCMD 125 to ensure real-time V2X communications are not compromised.

In one example shown in FIG. 4B, a cluster 435A moving along road 445 may be associated with window 455 (note that only the centerline of road 445 is shown for simplicity). At a later point in time, cluster 435A may move to another position along road 445 to cluster 435B. In order to compute the position of shifted window 460, the position of the centroid of cluster 435B may be updated as it moves along road 445 based on the telematics data received from the vehicles. Based upon the computed position of the centroid of cluster 435B, the displacement from window 455 to window 460 may be determined to establish the new position of window 460. Additional updates to moved cluster 435B may be performed due to vehicles being added and dropped from moved cluster 435B. For example, the boundary of window 460 may be used as a geo-fence to calculate newly added vehicles to cluster 435B, and to calculate newly dropped vehicles form cluster 435B.

Once all of the clusters have been updated in the service area, the BSP 435 may be updated so suitability metrics may be updated. Updating the clusters using parallel shifting clustering is very efficient, and has a computation complexity of $O(n)$, where n is the number of vehicles being processed. The frequency of cluster updates may be configured and based, for example, on the dynamics of the vehicles in the service area.

Figure 5:
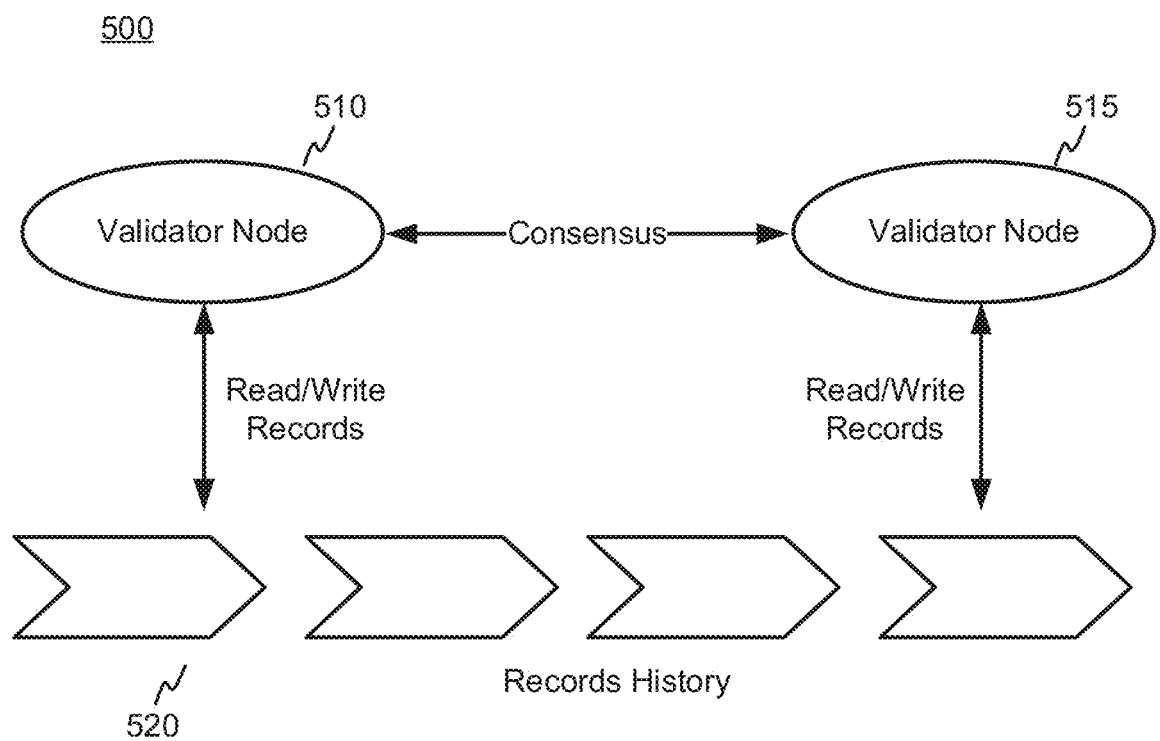
FIG. 5 is a block diagram illustrating exemplary data flows for securing V2X communications using a private block chain.

FIG. 5 is a block diagram illustrating exemplary data flows 500 for securing V2X communications using a private block chain. In addition to improving safety, the data provided by V2X communications can provide more detailed records of vehicle behaviors. Reconstructions of vehicle accidents to determine how fault should be apportioned are typically difficult. Accordingly, recording vehicle behaviors in a secure manner can provide credible evidence to assist road and traffic authorities and insurance companies. However, in order to protect the privacy of drivers, it is important to ensure the integrity of data stored in quad tree data structures is maintained and not accessible by hackers. Security of V2X communications data stored in quad tree data structures may be maintained by using Block Chain approaches.

Block Chains are distributed databases that maintains a continuously growing list of records, which is called a "block." All the records in the database can be secured from tampering and revision. The block chain, which may be similar to a linked list, contains a plurality of blocks, where each contains a timestamp and a link to previous block. One common use of block chains is to facilitate transactions for so-called "crypto-currencies" such as Bitcoin. For Bitcoin applications, block chains serve as a public ledger for all transactions. The block chains are decentralized, so no centralized copy exists and every node has a copy of the block chain. Once a record as been added to the block chain, it is broadcast to other nodes. With block chain, every user is equally trusted and a "Proof of Work" (POW) mechanism ensures each transaction is recorded and cannot be revised or tampered by other users.

The POW mechanism typically uses the calculation of a hash value that may take time, therefore a transaction may only be committed to the block chain every few minutes. However, for V2X communications, it is not necessary to use a POW mechanism, since V2X systems may validate identities of participating vehicles based on other credentials, such as, for example, the driver's name and/or license, a license plate number, a Vehicle Identification Number (VIN), an OBD interface identifier, a UE identifier (e.g., a media access controller identification (MAC ID), an international mobile subscriber identity (IMSI), etc.). Accordingly, the computational workload may be reduced by using a private block chain to secure the recording of data for V2X communication systems instead of a public block chain. Compared to a public block chain, running a private block chain is safer, because all validators are known and attacks from untrusted nodes are avoided. Since nodes are fully controlled by trusted members and faults may be detected and fixed through manual intervention, private block chain facilitates the use of consensus algorithms which can improve processing efficiency. Additionally, using private chain restricts read permissions to provide a greater level of privacy.

As is discussed above in reference to FIG. 3B, a quad tree data structure (e.g., quad tree data structure 300) may be used to efficiently represent the divided sub-quadrants of a binary space partition. The quad tree data structure can also be used to set up a private blockchain to secure V2X communications. Referring to FIG. 5, two nodes in a quad tree structure (510 and 515) may receive data from vehicles in their respective sub-quadrants in the binary space partition. Depending upon the computational power of VCMD 125, a predetermined number of nodes in the quad tree may be used to act as validator nodes in a blockchain. In the embodiment, shown in FIG. 5, two nodes, which are at the same level in the quad tree, may serve as validator nodes 510, 515. Validator nodes 510, 515 can collect data from child nodes and pack them into blocks. The newly created blocks may be appended to previously generated blocks in records history 520, and may be read from records history as needed. Thus, VCMD 125 may extend the existing block chain with currently determined blocks. Additionally, transactions (read/write operations) with the records history may be validated through a consensus mechanism which may prevent unauthorized access to the blocks in record history 520.

Figure 6:
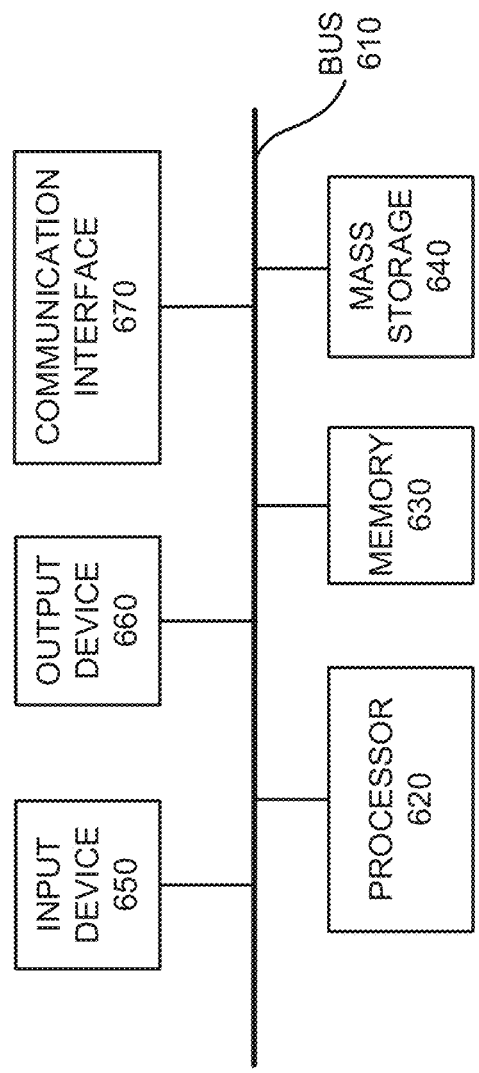
FIG. 6 is a block diagram showing exemplary components of a V2X communication management device (VCMD) according to an embodiment.

FIG. 6 is a block diagram showing exemplary components of a VCMD 125 according to an embodiment. VCMD 125 may include a bus 610, a processor 620, a memory 630, mass storage 640, an input device 650, an output device 660, and a communication interface 670.

Bus 610 includes a path that permits communication among the components of VCMD 125. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic. For example, processor 620 may be an x86 based CPU, and may use any operating system, which may include varieties of the Windows, UNIX, and/or Linux. Processor 620 may also use high-level analysis software packages and/or custom software written in any programming and/or scripting languages for interacting with other network entities.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read only memory (ROM) device or another type of static storage device, and/or a removable form of memory, such as a flash memory. Mass storage device 640 may include any type of on-board device suitable for storing large amounts of data, and may include one or more hard drives, solid state drives, and/or various types of Redundant Array of Independent Disk (RAID) arrays.

Input device 650, which may be optional, can allow an operator to input information into VCMD 125, if desired. Input device 650 may include, for example, a keyboard, a mouse, a pen, a microphone, a remote control, an audio capture device, an image and/or video capture device, a touch-screen display, and/or another type of input device. In some embodiments, VCMD 125 may be managed remotely and may not include input device 650. Output device 660 may output information to an operator of VCMD 125. Output device 660 may include a display (such as a Liquid Crystal Display (LCD)), a printer, a speaker, and/or another type of output device. In some embodiments, VCMD 125 may be managed remotely and may not include output device 660.

Communication interface 670 may include a logical component that includes input and/or output ports, input and/or output systems, and/or other input and output components that facilitate the transmission of data to other devices. For example, communication interface 670 may include a network interface card (e.g., Ethernet card) for wired communications and/or a wireless network interface (e.g., a Wi-Fi) card for wireless communications. Communication interface 670 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 670 may further include one or more Radio Frequency (RF) transceivers that enable communications with UEs via wireless channels supported by the wireless mobile communications system 102. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 620. For example, the RF transceiver may perform analog-to-digital and digital-to-analog conversion, modulation and demodulation, up-conversion and down-conversion, and/or amplification of signals.

As described below, VCMD 125 may perform certain operations for V2X communications in conjunction with EPC 120, mobile backhaul 122, and/or eNodeBs 110 (or other devices/systems in environment 100). VCMD 125 may perform these operations in response to processor 620 executing software instructions contained in a computer-readable medium, such as memory 630 and/or mass storage

640. The software instructions may be read into memory 630 from another computer-readable medium or from another device. The software instructions contained in memory 630 may cause processor 620 to perform processes described herein, such as, for example, process 700 depicted in FIG. 7. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of VCMD 125, in other implementations, VCMD 125 may include fewer components, different components, additional components, or differently arranged components than depicted in FIG. 6. In other embodiments, one or more network element(s) in environment 100 (e.g., network elements in ePC 120 and/or mobile backhaul 122, and/or UEs in vehicles 135-150) may be configured in a similar manner for managing V2X communications.

Figure 7:
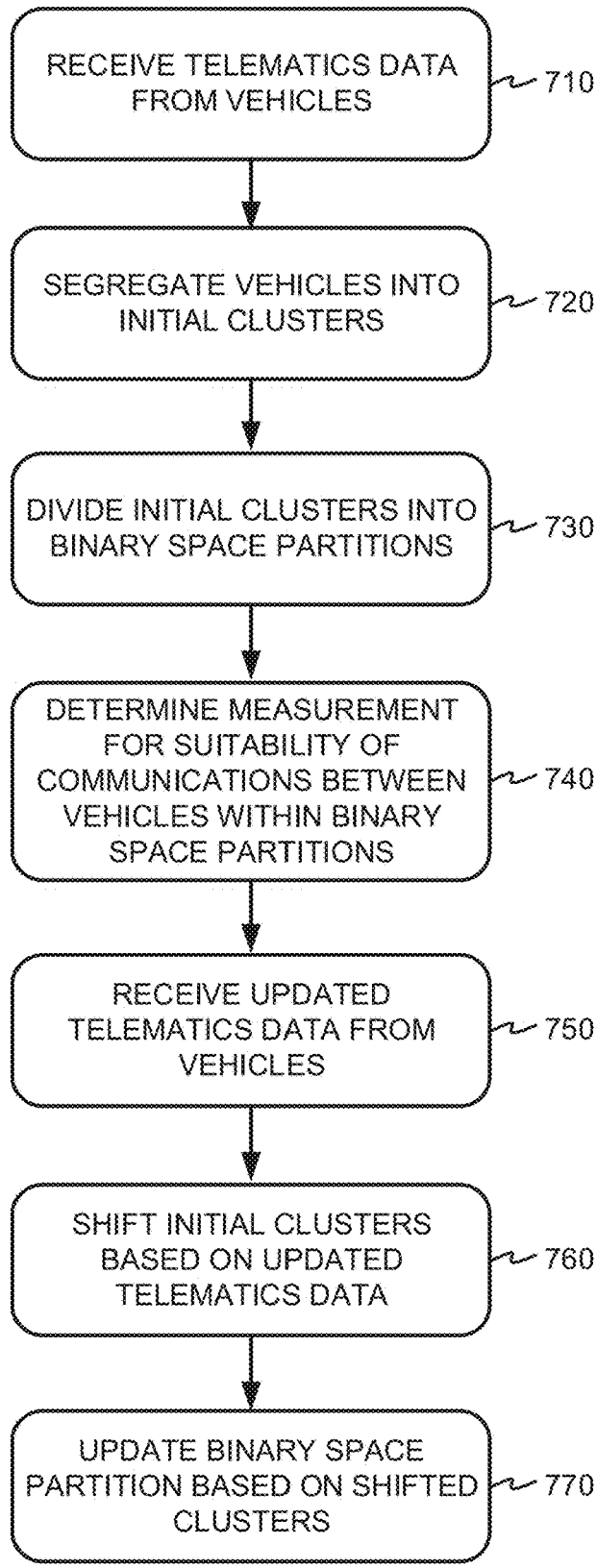
FIG. 7 is a flow chart showing an exemplary process for providing V2X communications.

FIG. 7 is a flow chart showing an exemplary process 700 for facilitating V2X communications in a service area. Process 700 may be performed by VCMD 125, for example, by executing instructions via processor 620. VCMD 125 may initially receive telematics data from a plurality of vehicles (e.g., via UEs in vehicles 135-150) within a service area (Block 710). The data may include vehicle state data such as, for example, position (e.g., latitude, longitude, WGS-84 rectangular coordinates, etc.), velocity, and time stamps. Telematics data may further include vehicle sensor information, such as, for example, steering angle data, brake sensor data, accelerator pedal status, brake pedal status, data from radar sensors, ultrasonic sensor, Forward Looking Infrared (FLIR) sensors, etc. Telematics data may further include meta-data about the vehicle type (private, commercial, public transport, government service, emergency service) and the communication type (private, police, fire, rescue, etc.).

VCMD 125 may segregate the plurality of vehicles into initial clusters based on the telematics data (Block 720). In an embodiment, VCMD 125 may perform initial clustering by selecting a point in the service area as an initial position. VCMD 125 may then determine a window over a geographic area that is centered on the selected point (e.g., window 420 and point 425 in FIG. 4A), and then compute a weighted mean based on positions of vehicles within the window. VCMD 125 may then shift the position of the window over the geographic area based on the weighted mean. VCMD 125 may iterate on this process by re-computing the weighted mean and shifting the position of the window until the center of the window converges on the weighted mean. In an embodiment the size or the shape of the window may be based on characteristics of communications between vehicles, which may include a bandwidth of the communication signal, or whether the communications is for emergency or normal purposes.

VCMD 125 may divide the initial clusters into binary space partitions having various sizes, wherein the size of each binary space partition is based on a maximum number of vehicles therein (Block 730). Once the BSPs are generated over the service area, VCMD 125 may determine, for a selected vehicle within an associated binary space partition, a metric representing the suitability of communications between the selected vehicle and the other vehicles in the associated binary space partition (Block 740).

In an embodiment, VCMD 125 may determine the metric representing the suitability by searching for matches (referred to as the "suitability metric"), within the associated binary space partition, between parameters associated with the selected vehicle and parameters associated with the other vehicles in the associated binary space partition. The parameters may include the vehicles' state data, such as, for example, position (e.g., latitude, longitude, WGS-84 rectangular coordinates, etc.), velocity, and time stamps associated with the position and velocity data. The parameters may further include the vehicles' sensor information, such as, for example, steering angle data, brake sensor data, accelerator pedal status, brake pedal status, data from radar sensors, ultrasonic sensor, Forward Looking Infrared (FLIR) sensors, etc. The parameters may further include meta-data about the vehicles' type (private, commercial, public transport, government service, emergency service) and their communication type (private, police, fire, rescue, etc.). In addition, information associated and/or derived from parameters associated with telematics data, such as, for example, terrain type, geography, weather, etc., may be used to calculate the suitability metric.

In an embodiment, the parameters may be stored in different layers, where a layer may be defined as a two-dimensional data structure having indices corresponding to geographic areas (e.g., the service area). Accordingly, the layers are linked together by geography (which may be delineated by latitude and longitude), and store elements (e.g., parameters) that share a common property. Each layer may contain a field of location specified by coordinates (e.g. latitude, longitude), where the stored element may be abstractly represented as a point, a line, a pixel, or an object. Layers may include different data storage types, such as, for example, raster layers and vector layers. Raster layers include pixels as samples within the two dimensional structure. Vector layers include points, lines, and other mathematical constructs (objects such as shapes) to represent data.

In an embodiment, when VCMD 125 searches for matches to determine the suitability metric, VCMD 125 may further compare one or more of positions, velocities, or times (associated with the positions and the velocities) of the selected vehicle and the other vehicles to ascertain a match for permitting inter-vehicle communications. In an embodiment, when VCMD 125 may alter the above described comparison based on one or more of class of vehicles in the associated binary space partition, a class of communication associated with the selected vehicle, a terrain type or weather conditions within the associated binary space partition. In another embodiment, when performing the comparing, VCMD 125 may calculate a distance metric between the selected vehicle and the other vehicles based on one or more of the positions, the velocities, or the times associated with the positions and the velocities. The distance metric may not be purely geometric, and can include various other parameters as noted above, and thus may be considered a "pseudo-distance."

As time progresses, VCMD 125 may receive updated telematics data from the plurality of vehicles (Block 750). In order to reflect the dynamics that have changed over time, VCMD 125 may then shift the initial clusters based on the updated telematics data (Block 760). In an embodiment, when VCMD 125 performs the shifting of the initial clusters based on the updated telematics data, VCMD 125 may determine a new position of the initial cluster based on the updated telematics data from the plurality of vehicles. VCMD 125 may further determine if any new vehicles have entered the boundary of the window centered on the shifted cluster based on the updated telematics data. Finally, VCMD 125 may determine if any vehicles have exited the boundary of the window centered on the shifted cluster based on the updated telematics data. Once the initial clusters have been updated by shifting, VCMD 125 may update the binary space partition based on the shifted clusters (Block 770). In this manner communications between vehicles may be reliable over time as vehicles move.

In order to ensure the security of the data collected and generated by VCMD 125, a private block chain may be used. In an embodiment, VCMD 125 may generate a quad tree data structure corresponding to the binary space partitions, and establish nodes in the quad tree as validator nodes for a private block chain, as described above with respect to FIG. 5. VCMD 125 may collect data exchanged between vehicles corresponding to children of the validator nodes in the quad tree data structure, pack the collected data into block, and then append the blocks to existing blocks in the private block chain.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 7, the order of the blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

What is claimed is:

1. A method, comprising:
   segregating a plurality of vehicles into clusters based on telematics data received from the vehicles;
   tracking the vehicles within a window which is centered based on the telematics data, wherein a position of the window is determined based on positions of the vehicles;
   dividing the vehicles within the window into partitions having sizes based on a maximum number of vehicles within the partitions;
   dividing the clusters into the partitions comprising binary space partitions of varying sizes;
   determining a metric representing a suitability of communications between the vehicles in the window;
   generating a quad tree data structure corresponding to the binary space partitions; and
   establishing nodes in the quad tree data structure as validator nodes for a block chain.

2. The method of claim 1, wherein at least one of a size or a shape of the window is based on characteristics of communications between the vehicles, wherein the characteristics comprise at least one of a bandwidth of a communication signal, or whether the communications are for emergency or non-emergency purposes.

3. The method of claim 1, further comprising:
   selecting a point as an initial position;
   determining the window over a geographic area that is centered on the selected point;
   computing a weighted mean based on the positions of vehicles within the window;
   shifting the position of the window over the geographic area based on the weighted mean; and
   repeating the computing of the weighted mean and the shifting the position of the window until the center of the window converges on the weighted mean.

4. The method of claim 1, further comprising:
   determining, for a first vehicle within an associated binary space partition, the metric between the first vehicle and other vehicles in the associated binary space partition;
   receiving updated telematics data from the other vehicles;
   shifting one or more of the clusters based on the updated telematics data; and
   updating the associated binary space partition based on the shifted clusters.

5. The method of claim 4, wherein shifting one or more of the clusters further comprises:
   determining a new position of the one or more of the clusters based on the updated telematics data;
   determining if any new vehicles have entered a boundary of the window centered on the shifted clusters based on the updated telematics data; and
   determining if any of the other vehicles have exited the boundary of the window centered on the shifted clusters based on the updated telematics data.

6. The method of claim 4, further comprising:
   collecting data exchanged between one or more vehicles corresponding to children of the validator nodes in the quad tree data structure;
   packing the collected data into blocks; and
   appending the blocks to existing blocks in the block chain.

7. The method of claim 4, wherein determining the metric representing the suitability of communications further comprises:
   searching for matches, within the associated binary space partition, between parameters associated with the first vehicle and parameters associated with the other vehicles.

8. The method of claim 7, wherein the parameters are stored in different layers, wherein a layer is a two-dimensional data structure having indices corresponding to geographic areas.

9. The method of claim 7, wherein searching for matches further comprises:
   comparing at least one of positions, velocities, or times associated with the positions and velocities of the first vehicle and the other vehicles to ascertain a match for permitting inter-vehicle communications.

10. The method of claim 9, wherein the comparing further comprises:
    altering the comparison based on at least one of class of vehicles in the associated binary space partition, a class of communication associated with the first vehicle, a terrain type or weather conditions within the associated binary space partition.

11. The method of claim 9, wherein the comparing further comprises:
    calculating a distance metric between the first vehicle and the other vehicles based on at least one of the positions, the velocities, or the times associated with the positions and velocities.

12. A device, comprising:
    an interface configured to communicate over a network;
    a memory configured to store instructions; and
    a processor, coupled to the interface and the memory, wherein the processor is configured to execute the instructions stored in the memory to:
      segregate a plurality of vehicles into clusters based on telematics data received from the vehicles,
      track the vehicles within a window which is centered based on the telematics data, wherein a position of the window is determined based on positions of the vehicles,
      divide the vehicles within the window into partitions having sizes based on a maximum number of vehicles within the partitions,
      divide the clusters into the partitions comprising binary space partitions of varying size,
      determine a metric representing a suitability of communications between the vehicles in the window,
      generate a quad tree data structure corresponding to the binary space partitions; and
      establish nodes in the quad tree data structure as validator nodes for a block chain.

13. The device of claim 12, wherein at least one of a size or a shape of the window is based on characteristics of communications between the vehicles, wherein the characteristics comprise at least one of a bandwidth of a communications signal, or whether the communications are for emergency or non-emergency purposes.

14. The device of claim 12, wherein the instructions further cause the processor to:
    select a point as an initial position;
    determine the window over a geographic area that is centered on the selected point;
    compute a weighted mean based on the positions of vehicles within the window;
    shift the position of the window over the geographic area based on the weighted mean; and
    repeat the computing of the weighted mean and the shifting of the position of the window until the center of the window converges on the weighted mean.

15. The device of claim 12, wherein the instructions further cause the processor to:
    determine, for a first vehicle within an associated binary space partition, the metric between the first vehicle and other vehicles in the associated binary space partitions;
    receive updated telematics data from the other vehicles;
    shift one or more of the clusters based on the updated telematics data; and
    update the associated binary space partition based on the shifted clusters.

16. The device of claim 15, wherein the instructions to determine the metric representing the suitability of communications further cause the processor to:
    search for matches, within the associated binary space partition, between parameters associated with the first vehicle and parameters associated with the other vehicles.

17. The device of claim 16, wherein the instructions to search for matches further cause the processor to:
    compare at least one of positions, velocities, or times associated with the positions and velocities of the first vehicle and the other vehicles to ascertain a match for permitting inter-vehicle communications.

18. The device of claim 17, wherein the instructions to compare further cause the processor to:
    alter the comparison based on at least one of class of vehicles in the associated binary space partition, a class of communication associated with the first vehicle, a terrain type or weather conditions within the associated binary space partition.

19. The device of claim 17, wherein the instructions to compare further cause the processor to:
    calculate a distance metric between the first vehicle and the other vehicles based on at least one of the positions, the velocities, or the times associated with the positions and velocities.

20. A non-transitory computer-readable medium comprising instructions, which, when executed by a processor, cause the processor to:
    segregate a plurality of vehicles into clusters based on telematics data received from the vehicles;
    track the vehicles within a window which is centered based on the telematics data, wherein a position of the window is determined based on positions of the vehicles;
    divide the vehicles within the window into partitions having sizes based on a maximum number of vehicles within the partitions; and
    divide the clusters into the partitions comprising binary space partitions of varying size,
    determine a metric representing a suitability of communications between the vehicles in the window,
    generate a quad tree data structure corresponding to the binary space partitions; and
    establish nodes in the quad tree data structure as validator nodes for a block chain.

* * * * *